United States Patent
Roy (10) Patent No.: US 11,244,193 B2
(45) Date of Patent: Feb. 8, 2022

(54) METHOD, APPARATUS AND COMPUTER PROGRAM PRODUCT FOR THREE DIMENSIONAL FEATURE EXTRACTION FROM A POINT CLOUD

(71) Applicant: HERE Global B.V., Eindhoven (NL)

(72) Inventor: Shubhabrata Roy, Geldrop (NL)

(73) Assignee: HERE GLOBAL B.V., Eindhoven (NL)

( * ) Notice: Subject to any disclaimer, the term of this patent is extended or adjusted under 35 U.S.C. 154(b) by 119 days.

(21) Appl. No.: 16/534,499

(22) Filed: Aug. 7, 2019

(65) Prior Publication Data

US 2021/0042557 A1 Feb. 11, 2021

(51) Int. Cl.
| | | |
|---|---|---|
| *G06K 9/46* | (2006.01) | |
| *G06T 7/11* | (2017.01) | |
| *G06K 9/62* | (2006.01) | |
| *G01S 17/89* | (2020.01) | |
| *G01S 17/58* | (2006.01) | |
| *G01S 17/93* | (2020.01) | |

(52) U.S. Cl.
CPC ............ *G06K 9/4604* (2013.01); *G01S 17/58* (2013.01); *G01S 17/89* (2013.01); *G06K 9/6267* (2013.01); *G06T 7/11* (2017.01); *G01S 17/93* (2013.01); *G05B 2219/35152* (2013.01)

(58) Field of Classification Search
CPC .... G06K 9/4604; G06K 9/6267; G01S 17/58; G01S 17/89; G01S 17/93; G06T 7/11; G05B 2219/35152
See application file for complete search history.

(56) References Cited

U.S. PATENT DOCUMENTS

| | | | |
|---|---|---|---|
| 8,401,225 B2 | 3/2013 | Newcombe et al. | |
| 10,878,583 B2 * | 12/2020 | Schmid | ................... G06T 7/269 |
| 10,891,795 B2 * | 1/2021 | Ha | ....................... G01C 21/005 |
| 2018/0074200 A1 | 3/2018 | Liu et al. | |
| 2018/0364717 A1 * | 12/2018 | Douillard | ........... G06K 9/00791 |
| 2019/0147250 A1 * | 5/2019 | Zhang | .................. G06K 9/6262 382/224 |

(Continued)

OTHER PUBLICATIONS

Wu, "SqueezeSeg: Convolutional Neural Nets with Recurrent CRF for Real-Time Road-Object Segmentation from 3D LiDAR Point Cloud" (Year: 2017).*

(Continued)

*Primary Examiner* — Oneal R Mistry
*Assistant Examiner* — Nicolas James Boyajian
(74) *Attorney, Agent, or Firm* — Alston & Bird LLP (57) ABSTRACT

Provided herein is a method, apparatus, and computer program product for classifying objects as static objects or dynamic objects based on point cloud data. Methods may include: receiving point cloud data representative of an environment; computing voxel sequences from the point cloud data; extracting voxel-wise semantic features from the voxel sequences; modeling voxel-wise temporal changes based on the voxel-wise semantic features; and classifying objects in the environment as dynamic objects or static objects based on the modeled voxel-wise temporal changes. Computing voxel sequences from the point cloud data may include using a voxel cloud connectivity segmentation method to group voxels in point clouds into perceptually meaningful regions.

14 Claims, 4 Drawing Sheets

(56) References Cited

U.S. PATENT DOCUMENTS

2020/0272816 A1* 8/2020 Endres ............... G06K 9/6221
2020/0410751 A1* 12/2020 Omari ................ G06F 16/29

OTHER PUBLICATIONS

Asvadi, A. et al., *3D Lidar-Based Static and Moving Obstacle Detection in Driving Environments: An Approach Based on Voxels and Multi-Region Ground Planes*, Robotics and Autonomous Systems (Jul. 25, 2016) 13 pages.

Behl, A. et al., *PointFlowNet: Learning Representations for Rigid Motion Estimation From Point Clouds*, [online] [retrieved Oct. 29, 2019] Retrieved from the Internet: http://www.cvlibs.net/publications/Behl2019CVPR.pdf (dated 2019) 10 pages.

Broggi, A. et al., *A Full-3D Voxel-Based Dynamic Obstacle Detection for Urban Scenario Using Stereo Vision*, Proceedings of the 16$^{th}$ International IEEE Annual Conference on Intelligent Transportation Systems (ITSC 2013) (Oct. 2013) 71-76.

Chen, Y. et al., *Pixel-Wise Deep Sequence Learning for Moving Object Detection*, IEEE Transactions on Circuits and System for video Technology (Nov. 2017) 13 pages.

Kochanov, D. et al., *Scene Flow Propagation for Semantic Mapping and Object Discovery in Dynamic Street Scenes*, [online] [retrieved Oct. 29, 2019], Retrieved from the Internet: https://www.vision.rwthaachen.de/media/papers/paper_compressed.pdf (dated 2016) 8 pages.

Sun, Z. et al., *Classification of MLS Point Clouds In Urban Scenes Using Detrended Geometric Features From Supervoxel-Based Local Contexts*, ISPRS Annals of the Photogrammetry, Remote Sensing and Spatial Information Sciences, vol. IV-2 (2018) 271-278.

Ushani, A.K., *Understanding a Dynamic World: Dynamic Motion Estimation of Autonomous Driving Using LIDAR*, Dissertation, Computer Science and Engineering, University of Michigan (2018) 127 pages.

* cited by examiner

METHOD, APPARATUS AND COMPUTER PROGRAM PRODUCT FOR THREE DIMENSIONAL FEATURE EXTRACTION FROM A POINT CLOUD

An example embodiment of the present invention relates generally to mapping and modeling a three dimensional environment, and more particularly, to using LIDAR data or equivalents thereof to accurately model an environment and to distinguish between static and dynamic objects to build or enhance comprehensive, high-definition maps.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. While most location-based services rely on maps, such as digital representations of conventional paper maps, these digital representations may suffer from a lack of granularity with respect to precise navigation and route guidance. Further, these digital representations of maps may rely upon widely available data with respect to roadways, but may lack detail beyond roadways.

Data received from infrastructure monitoring systems and crowd-sourced data has become ubiquitous and may be available for facilitating route guidance and navigation system information. However this data may be inconsistent due to changing features within an environment, such as dynamic objects that do not persist in the environment over time. As such, the gathered data may be of limited use. However, this data can be mined to provide various other services to users and to grow the availability of location-based services. Further, the ubiquity and relative low-cost of sensors provides access to tremendous amounts of data that can be used in various ways to enhance location-based services.

BRIEF SUMMARY

A method, apparatus, and computer program product are therefore provided for generating a three-dimensional model of an environment based on point cloud data. The point cloud data may be mined to provide various services to users and to grown the ability of location-based services. Further, the ubiquity and relatively low-cost of sensors to gather data such as point cloud data may provide access to tremendous amounts of data that can be used in various ways to enhance location-based services, such as through the generation and analysis of three-dimensional models of an environment. Embodiments may provide an apparatus including at least one processor and at least one non-transitory memory including computer program code instructions. The computer program code instructions configured to, when executed, cause the apparatus to at least: receive point cloud data representative of an environment; compute voxel sequences from the point cloud data; extract voxel-wise semantic features from the voxel sequences; model voxel-wise temporal changes based on the voxel-wise semantic features; and classify objects in the environment as static objects or dynamic objects based on the modeled voxel-wise temporal changes.

According to some embodiments, causing the apparatus to compute voxel sequences from the point cloud data may include causing the apparatus to use a voxel cloud connectivity segmentation method to group voxels in point clouds into perceptually meaningful regions. Causing the apparatus to extract voxel-wise semantic features from the voxel sequences may include causing the apparatus to: process the voxel sequences through an encoder-decoder based network to extract the voxel-wise semantic features. Causing the apparatus to model voxel-wise temporal changes based on the voxel-wise semantic features may include causing the apparatus to employ a three-dimensional convolutional long short-term memory network to generate the model.

The point cloud data of some embodiments may be captured by a LIDAR sensor, where causing the apparatus to classify objects in the environment as static objects or dynamic objects based on the modeled voxel-wise temporal changes may include causing the apparatus to employ a spatial transformer network to distinguish between LIDAR sensor movement and object movement. The apparatus of some embodiments may be caused to generate a three-dimensional surface model of the environment including objects classified as static and excluding objects classified as dynamic. The apparatus of some embodiments may be caused to employ the three-dimensional surface model of the environment to facilitate autonomous vehicle control.

Embodiments provided herein may include a computer program product having at least one non-transitory computer-readable storage medium having computer executable program code instructions stored therein. The computer-executable program code instructions may include program code instructions to: receive point cloud data representative of an environment; compute voxel sequences from the point cloud data; extract voxel-wise semantic features from the voxel sequences; model voxel-wise temporal changes based on the voxel-wise semantic features; and classify objects in the environment as dynamic objects or static objects based on the modeled voxel-wise temporal changes.

The program code instructions to compute voxel sequences from the point cloud data may, in some embodiments, include program code instructions to use a voxel cloud connectivity segmentation method to group voxels in point clouds into perceptually meaningful regions. The program code instructions to extract voxel-wise semantic features from the voxel sequences may, according to some embodiments, include program code instructions to employ a three-dimensional convolutional long short-term memory network to generate the model.

The point cloud data of some embodiments may be captured by a LIDAR sensor, where the program code instructions to classify objects in the environment as dynamic objects or static objects based on the modeled voxel-wise temporal changes may include program code instructions to employ a spatial transformer network to distinguish between LIDAR sensor movement and object movement. Embodiments may include program code instructions to generate a three-dimensional surface model of the environment including objects classified as static objects and excluding objects classified as dynamic objects. Embodiments may include program code instructions to employ the three-dimensional surface model of the environment to facilitate autonomous vehicle control.

Embodiments of the present disclosure may provide a method for classifying objects as static objects or dynamic objects based on point cloud data. Methods may include: receiving point cloud data representative of an environment; computing voxel sequences from the point cloud data; extracting voxel-wise semantic features from the voxel sequences; modeling voxel-wise temporal changes based on the voxel-wise semantic features; and classifying objects in the environment as dynamic objects or static objects based on the modeled voxel-wise temporal changes. Computing voxel sequences from the point cloud data may include using a voxel cloud connectivity segmentation method to group voxels in point clouds into perceptually meaningful regions.

Extracting voxel-wise semantic features from the voxel sequences may include processing the voxel sequences through an encoder-decoder based network to extract the voxel-wise semantic features. Modeling voxel-wise temporal changes based on the voxel-wise semantic features may include employing a three-dimensional convolutional long short-term memory network to generate the model. The point cloud data may be captured by a LIDAR sensor, where classifying objects in the environment as dynamic objects or static objects based on the modeled voxel-wise temporal changes may include employing a spatial transformer network to distinguish between LIDAR sensor movement and object movement. Methods may include generating a three-dimensional surface model of the environment including objects classified as static objects and excluding objects classified as dynamic objects. Methods may include employing the three-dimensional surface model of the environment to facilitate autonomous vehicle control.

Embodiments of the present disclosure may provide an apparatus for classifying objects as static objects or dynamic objects based on point cloud data. An example apparatus may include: means for receiving point cloud data representative of an environment; means for computing voxel sequences from the point cloud data; means for extracting voxel-wise semantic features from the voxel sequences; means for modeling voxel-wise temporal changes based on the voxel-wise semantic features; and means for classifying objects in the environment as dynamic objects or static objects based on the modeled voxel-wise temporal changes. The means for computing voxel sequences from the point cloud data may include means for using a voxel cloud connectivity segmentation method to group voxels in point clouds into perceptually meaningful regions.

The means for extracting voxel-wise semantic features from the voxel sequences may include means for processing the voxel sequences through an encoder-decoder based network to extract the voxel-wise semantic features. The means for modeling voxel-wise temporal changes based on the voxel-wise semantic features may include means for employing a three-dimensional convolutional long short-term memory network to generate the model. The point cloud data may be captured by a LIDAR sensor, where the means for classifying objects in the environment as dynamic objects or static objects based on the modeled voxel-wise temporal changes may include means for employing a spatial transformer network to distinguish between LIDAR sensor movement and object movement. An apparatus may include means for generating a three-dimensional surface model of the environment including objects classified as static objects and excluding objects classified as dynamic objects. An apparatus may include means for employing the three-dimensional surface model of the environment to facilitate autonomous vehicle control.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for modelling or mapping three-dimensional environments including identifying static and dynamic objects within the three-dimensional environment. Embodiments described herein provide a system with techniques to reconstruct a three-dimensional point cloud model to identify and distinguish static objects from dynamic objects to facilitate mapping and navigation, along with improved environmental awareness for autonomous or semi-autonomous vehicle control. The three-dimensional point cloud may be generated by, for example, a LIDAR (Light Distancing and Ranging) sensor that collects point information in a three-dimensional environment.

While LIDAR is described herein according to example embodiments for establishing the position of objects in a three-dimensional point cloud, a variety of techniques may be used to accomplish a similar three-dimensional point cloud. Light sensing, imagery (e.g., multi-view such as stereoscopic), acoustic sensing, or various other forms of surface detection techniques may be used for generating a three-dimensional point cloud. Thus, while LIDAR is described with regard to example embodiments, various embodiments may use techniques other than LIDAR.

Figure 1:
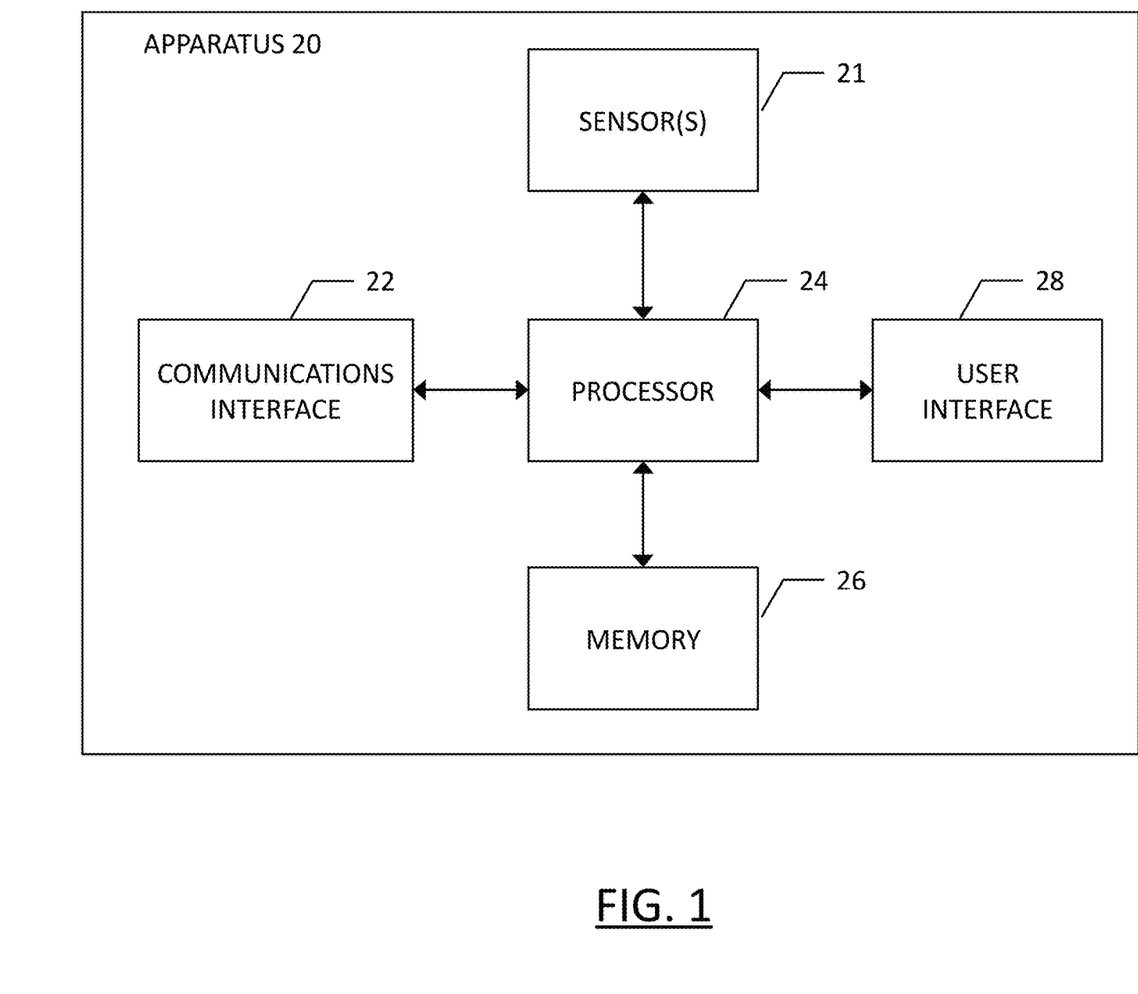
FIG. 1 is a block diagram of an apparatus according to an example embodiment of the present disclosure.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering position/location and environment related information and/or for generating a three-dimensional map and/or model for use in a variety of applications. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), LIDAR sensor (transmitter and receiver), local positioning sensor (e.g., odometer or wheel sensor), or any of a variety of sensors configured to establish location information and environment information around the sensor(s). Any of the sensors may be used to sense information regarding the movement, positioning, or orientation of the device and for determining the structure and layout of the surroundings or environment at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as surfaces in the surroundings of the sensor and establish location based on other sensor data, such as GPS data, for structure information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways or within enclosed or substantially enclosed structures, such as multi-level parking garages. Devices and systems may receive an indication of a current location of the user, and any structure-related data associated with the current location or destination of a user, such as a parking structure proximate a user's destination. It is, however, appreciated that example embodiments described herein can be implemented outside of a navigation system, such as on a user device or other device that may not necessarily also provide navigation services.

Figure 2:
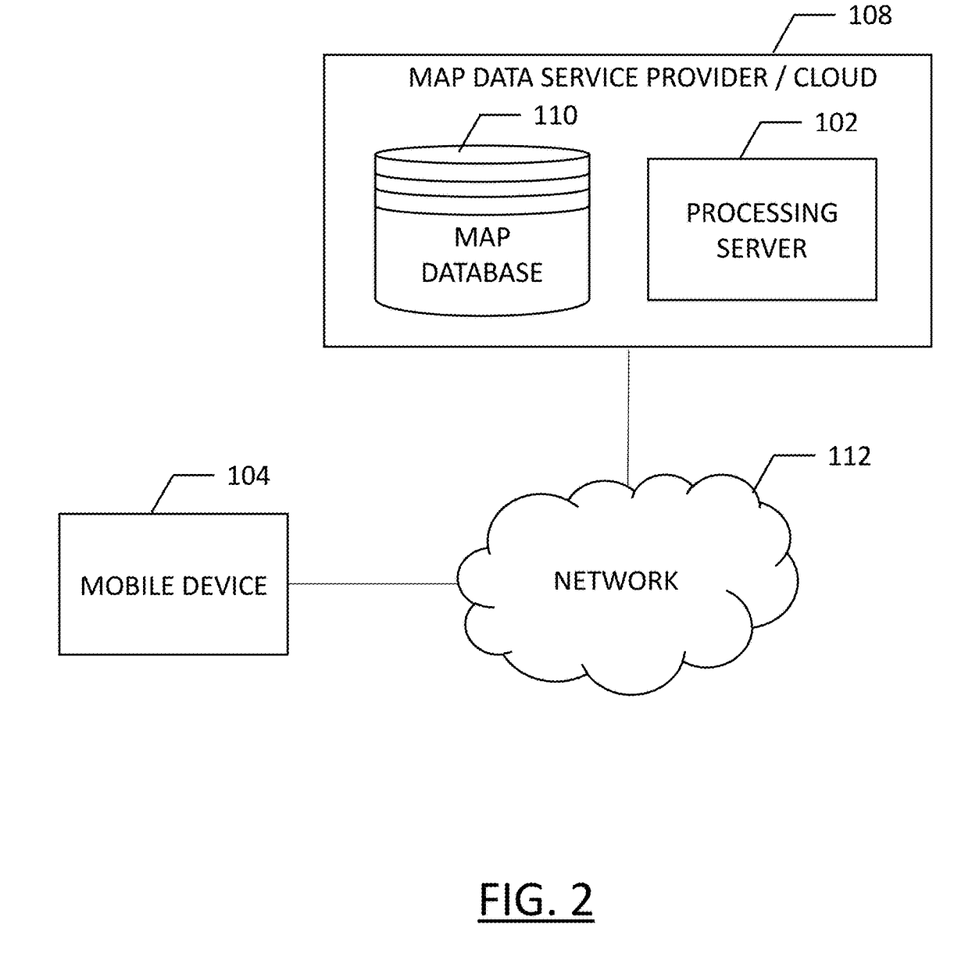
FIG. 2 is a block diagram of a system for generating a model of a three dimensional environment according to an example embodiment of the present disclosure.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, maneuvering data, and/or data regarding structures. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, parking lots, parking structures (e.g., multi-level parking structures), etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning. However, the most ubiquitous form of data that may be available is vehicle data provided by vehicles, such as mobile device 104, as they travel the roads throughout a region, network of roads, or within a structure. These vehicles or probes may be embodied by mobile device 104 and may provide data to the map data service provider in the form of traffic speed/congestion data, weather information, location, speed, direction, building structure information etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can further provide navigation through enclosed structures, such as a multi-level parking structure, and may facilitate autonomous vehicle control, such as autonomous parking within a multi-level parking structure. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases, where navigation databases can include data related to the structure of multi-level vehicle parking structures to facilitate navigation thereof.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include a vehicle infotainment system, an in-dash navigation head unit, a personal navigation device, cellular telephone, or an Advanced Driver Assistance System (ADAS) which may facilitate automated driving features such as autonomous driving and/or parking. An end user can use the mobile device 104 for navigation and map functions such as guidance and map display, for example, and for determination of useful driver assistance information, according to some example embodiments.

Example embodiments provided herein provide a method for three-dimensional feature extraction from a point cloud and identifying features or objects in the point cloud as static or dynamic objects. Autonomous vehicles, in particular, need a resilient and relevant perception of the real-world environment around them to properly function in a dynamic environment. Autonomous vehicles need to understand the presences of objects and their locations to safely navigate as a human driver would. Provided herein is a deep-learning based method that uses voxel sequences as input and can discriminate between static or stationary objects and dynamic or moving objects. Embodiments may further enhance high definition (HD) three-dimensional precision maps to reflect static and dynamic objects to facilitate autonomous and semi-autonomous vehicle control. Some example embodiments may be used for real-time tracking and/or object identification, which may be part of vehicle features (e.g., notifications or displays to drivers/passengers of manual and/or autonomous vehicles), or may be associated with other devices such as a feature on a drone or mobile device (e.g., for augmented reality or other mobile device displays or user interfaces configured to provide notifications).

Embodiments described herein can be used to create improved three-dimensional mapping contents directly from spatial point clouds such as LIDAR data without losing valuable information that may be lost during conversion between three-dimensional and two-dimensional representations. As dynamic objects may be reliably and repeatably detected and identified, these objects can be omitted as appropriate from the three-dimensional point cloud to process and develop high quality three-dimensional maps of static objects and environments.

Accurate and concise maps are necessary for high definition three-dimensional precision maps to ensure proper functionality of some applications in the perspective of scalability. For example, autonomous vehicle control requires an accurate and concise map to safely navigate an environment. Methods described herein use voxelized input from a three-dimensional point cloud to generate voxel masks to distinguish between static and dynamic objects, whereby reconstruction of an environment may then be performed for better three-dimensional map creation and to use the object information for autonomous vehicle control.

Navigation of roadways through digital map data can be informed through map data from municipalities, probe data from vehicles traversing the roads, or known vehicles traversing roads to establish the physical location of the roads. This mapping enables relatively accurate mapping of roadways and facilitates navigation and autonomous driving application. However, for increased autonomous vehicle functionality, a higher degree of accuracy and reliability is needed for objects found along roadways than conventionally provided by map data resources. While such map data resources may provide sufficient detail for certain applications, mapping and autonomous driving or parking may require more detailed and accurate representations of physical structures and environments through which a vehicle is navigating.

Three-dimensional point cloud reconstruction of a physical structures and objects based on range sensor data such as RGB-D or LIDAR sensors may provide raw measurement and visualization for the construction of a structure. This point cloud can be useful for on-the-fly environment perception and obstacle detection. However, due to a lack of parametric and semantic representation, three-dimensional point cloud reconstruction may not be sufficient for high-level applications such as navigation or autonomous vehicle control (e.g., driving, parking, etc.).

Example embodiments described herein provide a system to overcome the aforementioned deficiencies. A system may include a mobile device, such as apparatus 20 of FIG. 1, which may be a sensing vehicle having three-dimensional LIDAR (or the like vision sensors), GPS, and/or INS (inertial navigation sensing) unit. The sensing vehicle may obtain the necessary data from an environment including sensed objects to reconstruct the environment and objects in a three-dimensional map. The sensing vehicle may obtain sensor data as the vehicle traverses the environment to provide sensor data output which may be stored in, for example, memory 26. The sensed data may be provided to a server, such as processing server 102 of map data service provider 108 for reconstruction of the three-dimensional map of the environment. Optionally, the sensed data may be processed by the sensing device (e.g., an apparatus as in FIG. 1) and a three-dimensional model of the environment or objects therein may be generated in real-time as the apparatus traverses the structure.

While mapping may be performed on sensed data from a single vehicle or mobile device 104, embodiments may benefit from a plurality of vehicles or mobile devices 104 providing data regarding the same environment in order to minimize any data noise and to improve the accuracy of the three-dimensional map reconstruction and object identification and locating.

The sensor platform may be a vehicle specifically configured for generating the necessary sensed data or may be crowd-sourced from a vehicle that has the same sensing capabilities that has collected data from the structure of interest (e.g., the structure to be mapped). Such a vehicle may include a three-dimensional LIDAR range sensor or image sensors configured to measure the surroundings of the vehicle, and a GPS/INS unit that allows for positioning outside of the structure for providing an augmented reference for the LIDAR odometry. The mobile device 104 or sensing vehicle may use GPS/INS for global positioning within a geographic region, while the three-dimensional LIDAR sensor or image sensor may collect the range or environment data surrounding the vehicle, colored by the reflectivity field, and may be synchronized with the GPS/INS data for fused LIDAR odometry.

The voxel sequences may be computed from the point cloud data using the voxel cloud connectivity segmentation (VCCS) approach. This groups voxels in point clouds into perceptually meaningful regions. According to some embodiments, after the reconstruction of the three-dimensional point cloud model, the LIDAR points may be projected and re-sampled into a voxel space representation. A result of re-sampling is that each voxel contains one and only one point. More points in a voxel will increase the information loss since the voxel will get only one value at the end. Conversely, if the voxel size is too small and the number of voxels that contain no data points becomes large, the redundancy increases as well as the storage requirements. Considering LIDAR points which are not highly irregular, the optimal re-sampling pixel size may be equal to the minimum density of the LIDAR points based on a random down-sampling sub-datasets at a certain distance.

Figure 3:
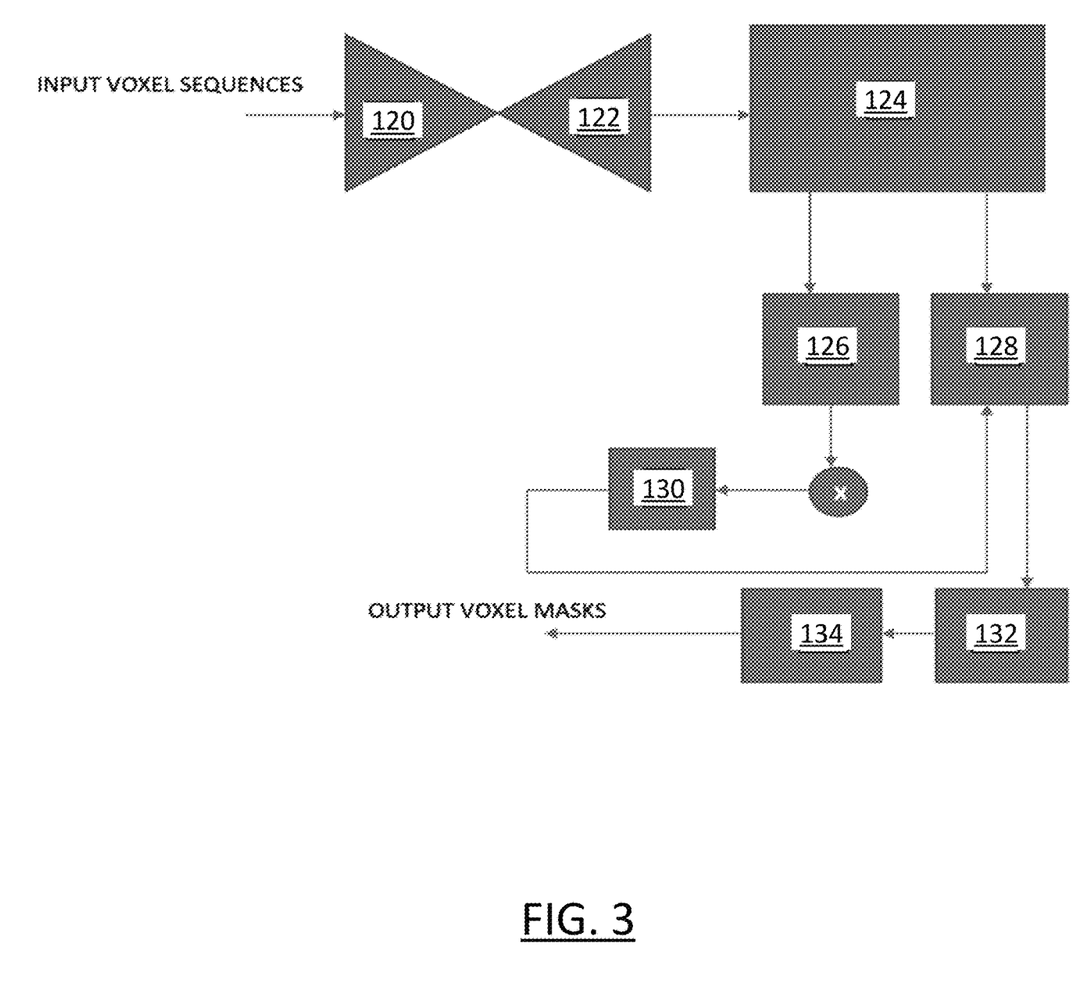
FIG. 3 is an example embodiment of the process flow for classifying objects in an environment as static objects or dynamic objects based on temporal point cloud data according to an example embodiment of the present disclosure.

The voxel space representation includes a plurality of voxel sequences that may be used as input data for example embodiments described herein. FIG. 3 illustrates an example embodiment in which voxel sequences are input into an encoder 120 and decoder 122 which are part of a deep convolutional encoder-decoder network. The encoder 120 convolutional network encodes semantic information from the input to low resolution feature maps. The decoder 122 network mirrors the encoder with the exception of the non-linearity layer. The decoder layer uses spatial up-sampling to bring the output back to the original size. The output of the encoder-decoder network is then used by a three-dimensional convolutional LSTM (long short-term memory networks) 124 for voxel-wise sequencing with a temporal context. Three-dimensional calculation of the voxel-wise sequencing in the temporal context can use the LSTM to model the rate of change of the environment represented by the voxel sequences.

The output of the LSTM 124 is provided to both a three-dimensional attention module 126 and a three-dimensional stochastic transformer network 128. At the three-dimensional attention module 126 extracts pixel-level semantic features to model pixelwise changes over time, while the output from the three-dimensional attention module 126 is provided to an attention-weighted three-dimensional feature map 130. The three-dimensional attention model selects the best views of an environment from which to scan for object classification (dynamic or static) as well as the most informative regions in each view to focus on to achieve efficient object recognition.

Moving object detection is a voxel-wise sequence labeling problem with a temporal context. The three-dimensional attention module uses three-dimensional attention convolutional long short-term memory networks to model the temporal context at 126 and weight each location based on convolutional neural network features at 130. The convolutional neural network long short-term memory network (CNN-LSTM) uses convolutional neural network layers for feature extraction on input data combined with long short-term memory networks to support sequence prediction. This type of model is spatially and temporally deep and can be applied to dynamic visual input in the form of the voxel sequencing described herein.

The three-dimensional attention convolutional long short-term memory network contains convolutional structures with residual blocks and the attention model and LSTM can learn meaningful structure from an ordered sequence. Further, the rate of changes of the internal state of the three-dimensional attention convolutional long short-term memory network can be finely modulated by the recurrent weights, which contribute to the network's robustness against localized distortions of the input data. To modulate the recurrent weights, customized spatio-temporal three-dimensional convolutional long short-term memory cells are used with the same layout as the input. At each time step, the three-dimensional convolutional long short-term memory module receives the semantic features of a new LIDAR snapshot as the input. This is used together with the memory content and output of the previous operation to compute new memory activations. To allow the model to focus on the most important segments of incoming features, as well as potentially adding a degree of interpretability, a soft attention mechanism may be added to the three-dimensional convolutional long short-term memory model.

The recurrent structure of the three-dimensional convolutional long short-term memory can preserve the temporal information and the convolution operation to make the three-dimensional tensor preserve the spatial information. A three-dimensional convolutional long short-term memory with a larger transitional kernel may be able to capture faster motions, while one with a smaller kernel may capture slower motions.

The output of the three-dimensional attention module 126 and the attention weighted three-dimensional feature map 130 is fed, along with temporally aligned output from the three-dimensional convolutional long short-term memory network 124, into the three-dimensional stochastic transformer network (3D STN). The 3D STN model is used to compensate global camera motion and correct the deviation caused by local motion. The 3D STN may thus be used to distinguish movement of the captured image frame versus object movement within the frame. This use of the 3D STN enhances the overall robustness of embodiments described herein.

The output of the 3D STN is provided to a conditional random fields (CRF) layer. The three-dimensional conditional random fields (CRF) layer 132 used as a recurrent neural network (RNN) may provide a finer description from the different pairs of foreground labels. The output of the CRF 132 is provided to a Softmax function 134 to identify objects in the environment as static or dynamic.

Figure 4:
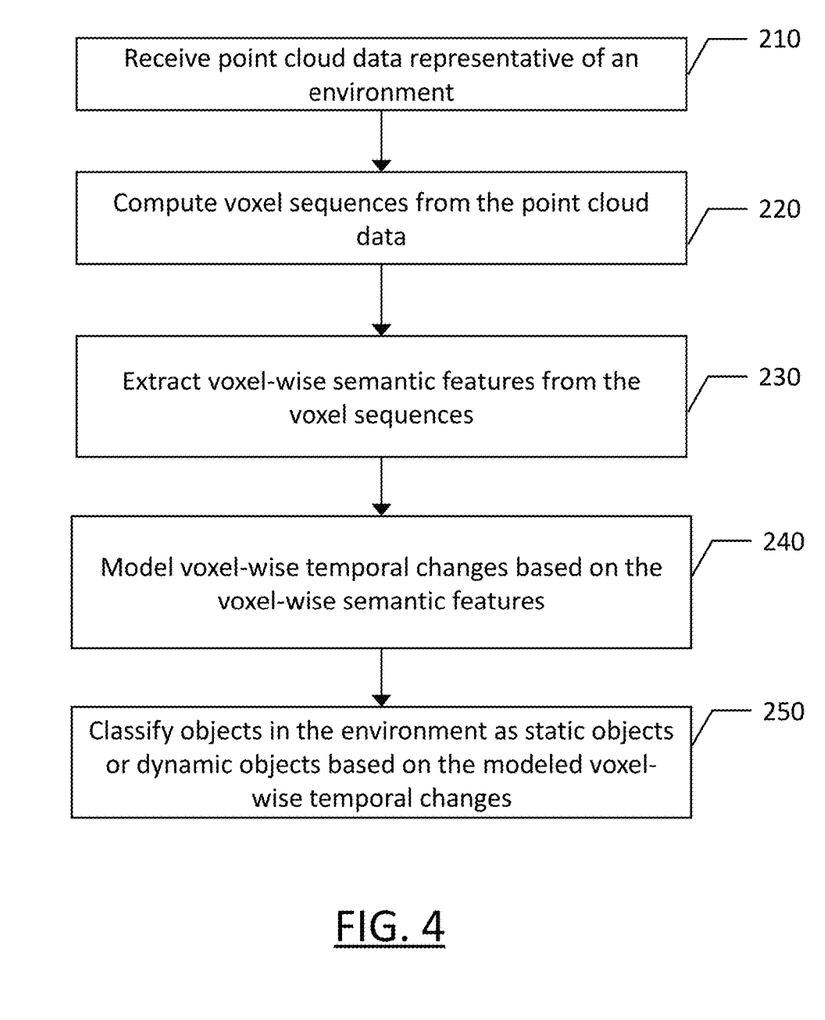
FIG. 4 is a flowchart of a method for classifying objects in an environment as static or dynamic objects according to an example embodiment of the present disclosure.

FIG. 4 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method for classifying objects in an environment as static objects or dynamic objects for the purpose of modeling the environment as a three-dimensional space. As shown, point cloud data representative of an environment is received at 210. This point cloud data may be generated by a sensor, such as sensor 21 of FIG. 1, which may include a LIDAR sensor. From that point cloud data, voxel sequences are computed at 220. The voxel sequences may be generated from the point cloud data using, for example, processor 24 of FIG. 1, applying a Voxel Cloud Connectivity Segmentation approach to group voxels in the point cloud into perceptually meaningful regions. Using the voxel sequences, at 230 voxel-wise semantic features are extracted from the voxel sequences. The voxel sequences are fed into an encoder-decoder network as described above to extract voxel-wise semantic features. Voxel-wise temporal changes are then modeled at 240 based on the voxel-wise semantic features. A combination of three-dimensional convolutional long-term short memory (LSTM) and three-dimensional attention model may be used to model voxel-wise temporal changes, where the three-dimensional attention model selects the best views to scan from as well as informing the most informative regions in each view to focus on to achieve efficient object recognition. Objects in the environment of the point cloud data are then classified at 250 as to whether they are static objects or dynamic objects based on the modeled voxel-wise temporal changes.

In an example embodiment, an apparatus for performing the method of FIG. 6 above may comprise a processor (e.g., the processor 24) configured to perform some or each of the operations (210-250) described above. The processor may, for example, be configured to perform the operations (210-250) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-250 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
receive point cloud data representative of an environment captured by a LIDAR sensor;
compute voxel sequences from the point cloud data;
extract voxel-wise semantic features from the voxel sequences;
model voxel-wise temporal changes for each of a plurality of locations based on the voxel-wise semantic features using a convolutional long short-term memory network to generate the model with each of the plurality of locations weighted based on convolutional neural network features; and
classify objects in the environment as dynamic objects or static objects based on the modeled voxel-wise temporal changes and based on output of a spatial transformer network provided to a three-dimensional conditional random field layer to distinguish between LIDAR sensor movement and object movement to identify objects in the environment as dynamic objects or static objects.

2. The apparatus of claim 1, wherein causing the apparatus to compute voxel sequences from the point cloud data comprises causing the apparatus to use a voxel cloud connectivity segmentation method to group voxels in point clouds into perceptually meaningful regions.

3. The apparatus of claim 1, wherein causing the apparatus to extract voxel-wise semantic features from the voxel sequences comprises causing the apparatus to: process the voxel sequences through an encoder-decoder based network to extract the voxel-wise semantic features.

4. The apparatus of claim 1, wherein the apparatus is further caused to:
generate a three-dimensional surface model of the environment including objects classified as static objects and excluding objects classified as dynamic objects.

5. The apparatus of claim 4, wherein the apparatus is further caused to:
employ the three-dimensional surface model of the environment to facilitate autonomous vehicle control.

6. A computer program product comprising at least one non-transitory computer-readable storage medium having computer-executable program code instructions stored therein, the computer-executable program code instructions comprising program code instructions to:
receive point cloud data representative of an environment captured by a LIDAR sensor;
compute voxel sequences from the point cloud data;
extract voxel-wise semantic features from the voxel sequences;
model voxel-wise temporal changes for each of a plurality of locations based on the voxel-wise semantic features using a convolutional long short-term memory network to generate the model with each of the plurality of locations weighted based on convolutional neural network features; and
classify objects in the environment as dynamic objects or static objects based on the modeled voxel-wise temporal changes and based on output of a spatial transformer network provided to a three-dimensional conditional random field layer to distinguish between LIDAR sensor movement and object movement to identify objects in the environment as dynamic objects or static objects.

7. The computer program product of claim 6, wherein the program code instructions to compute voxel sequences from the point cloud data comprises program code instructions to use a voxel cloud connectivity segmentation method to group voxels in point clouds into perceptually meaningful regions.

8. The computer program product of claim 6, wherein the program code instructions to extract voxel-wise semantic features from the voxel sequences comprises program code instructions to: process the voxel sequences through an encoder-decoder based network to extract the voxel-wise semantic features.

9. The computer program product of claim 6, further comprising program code instructions to:
generate a three-dimensional surface model of the environment including objects classified as static objects and excluding objects classified as dynamic objects.

10. The computer program product of claim 9, further comprising program code instructions to:
employ the three-dimensional surface model of the environment to facilitate autonomous vehicle control.

11. A method comprising:
receiving point cloud data representative of an environment captured by a LIDAR sensor;
computing voxel sequences from the point cloud data;
extracting voxel-wise semantic features from the voxel sequences;
modeling voxel-wise temporal changes for each of a plurality of locations based on the voxel-wise semantic features using a convolutional long short-term memory network to generate the model with each of the plurality of locations weighted based on convolutional neural network features; and
classifying objects in the environment as dynamic objects or static objects based on the modeled voxel-wise temporal changes and based on output of a spatial transformer network provided to a three-dimensional conditional random field layer to distinguish between LIDAR sensor movement and object movement to identify objects in the environment as dynamic objects or static objects.

12. The method of claim 11, wherein computing voxel sequences from the point cloud data comprises using a voxel cloud connectivity segmentation method to group voxels in point clouds into perceptually meaningful regions.

13. The method of claim 11, wherein extracting voxel-wise semantic features from the voxel sequences comprises processing the voxel sequences through an encoder-decoder based network to extract the voxel-wise semantic features.

14. The method of claim 11, further comprising:
generating a three-dimensional surface model of the environment including objects classified as static objects and excluding objects classified as dynamic objects; and
employing the three-dimensional surface model of the environment to facilitate autonomous vehicle control.

* * * * *